(12) United States Patent
Hu et al.

(10) Patent No.: US 11,860,443 B2
(45) Date of Patent: Jan. 2, 2024

(54) OPTICAL SYSTEM

(71) Applicant: TDK TAIWAN CORP., Taoyuan (TW)

(72) Inventors: Chao-Chang Hu, Taoyuan (TW); Chih-Wei Weng, Taoyuan (TW); Shu-Shan Chen, Taoyuan (TW); Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 216 days.

(21) Appl. No.: 17/383,955

(22) Filed: Jul. 23, 2021

(65) Prior Publication Data

US 2022/0026666 A1    Jan. 27, 2022

Related U.S. Application Data

(60) Provisional application No. 63/056,183, filed on Jul. 24, 2020.

(51) Int. Cl.
| | |
|---|---|
| *G02B 7/09* | (2021.01) |
| *G02B 13/00* | (2006.01) |
| *G02B 27/64* | (2006.01) |
| *G02B 7/08* | (2021.01) |
| *G03B 5/02* | (2021.01) |
| *G02B 7/02* | (2021.01) |

(52) U.S. Cl.
CPC ............... *G02B 7/09* (2013.01); *G02B 7/023* (2013.01); *G02B 7/025* (2013.01); *G02B 7/026* (2013.01); *G02B 7/08* (2013.01); *G02B 13/0065* (2013.01); *G02B 27/646* (2013.01); *G03B 5/02* (2013.01); *G03B 2205/0053* (2013.01)

(58) Field of Classification Search
CPC ... G02B 7/04; G02B 7/08; G02B 7/09; G02B 7/102; G02B 13/0065
See application file for complete search history.

(56) References Cited

U.S. PATENT DOCUMENTS

| | | | | |
|---|---|---|---|---|
| 5,592,335 A | * | 1/1997 | Omi ..................... | G02B 7/102 359/740 |
| 2005/0062346 A1 | * | 3/2005 | Sasaki .................. | G02B 7/102 310/323.05 |
| 2019/0243112 A1 | * | 8/2019 | Yao ..................... | G02B 13/0065 |
| 2020/0057313 A1 | * | 2/2020 | Lee ...................... | G03B 17/17 |
| 2020/0409015 A1 | * | 12/2020 | Kim ..................... | G03B 3/10 |

(Continued)

FOREIGN PATENT DOCUMENTS

EP          1780567 A1 *  5/2007  ........... G02B 13/005

*Primary Examiner* — Cara E Rakowski
(74) *Attorney, Agent, or Firm* — MUNCY, GEISSLER, OLDS & LOWE, P.C.

(57) ABSTRACT

An optical system is provided. The optical system includes a fixed portion and a movable portion. The movable portion is movable relative to the fixed portion and includes: a first movable portion and a second movable portion. The first movable portion is configured to connect a first optical element. The second movable portion is configured to connect a second optical element and is movable relative to the first movable portion. The movable portion also includes a third optical element disposed corresponding to the first optical element and the second optical element. Light passes through the first optical element, the second optical element and the third optical element.

18 Claims, 6 Drawing Sheets

(56) References Cited

U.S. PATENT DOCUMENTS

| | | | |
|---|---|---|---|
| 2021/0103124 A1* | 4/2021 | Chen | G02B 13/0065 |
| 2021/0247588 A1* | 8/2021 | Huang | H02K 41/0356 |
| 2021/0389645 A1* | 12/2021 | Kim | G02B 7/102 |
| 2022/0026665 A1* | 1/2022 | Wang | G03B 30/00 |
| 2022/0299730 A1* | 9/2022 | Jang | H04N 23/69 |
| 2022/0357556 A1* | 11/2022 | Hsiao | G02B 15/142 |

* cited by examiner

OPTICAL SYSTEM

CROSS REFERENCE TO RELATED APPLICATIONS

This application claims the benefit of U.S. Provisional Application No. 63/056,183, filed Jul. 24, 2020, the entirety of which is incorporated by reference herein.

BACKGROUND

Technical Field

The disclosure relates to an optical system, and in particular to an optical system including a plurality of movable portions to hold different optical elements, wherein some of the optical elements are movable relative to some of the other optical elements.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choice.

Electronic devices with a camera or video function usually have an optical system, and light may pass through an optical element disposed in the optical system and form an image on a photosensitive member. By means of driving the optical element to move, an autofocus (AF) and/or optical image stabilization (OIS) function is achieved.

However, the arrangement of the optical system may occupy a certain amount of space, limiting the design of the electronic devices. As a result, the size of the electronic devices is usually not sufficient to meet users' requirements. Therefore, how to solve the aforementioned problem has become an important topic.

BRIEF SUMMARY

The present disclosure provides an optical system. The optical system includes a fixed portion and a movable portion. The movable portion is movable relative to the fixed portion and includes: a first movable portion and a second movable portion. The first movable portion is configured to connect a first optical element. The second movable portion is configured to connect a second optical element and is movable relative to the first movable portion. The movable portion also includes a third optical element disposed corresponding to the first optical element and the second optical element. Light passes through the first optical element, the second optical element and the third optical element.

In an embodiment, the optical system further includes: a first driving assembly configured to drive the first movable portion to move; and a second driving assembly configured to drive the second movable portion to move relative to the fixed portion. The second driving assembly is configured to drive the second movable portion to move relative to the first movable portion. In an embodiment, the optical system further includes a light flux device, wherein the light beam passes through the first optical element, the light flux device, and the second optical element in sequence. In an embodiment, a distance between the light flux device and the first optical element is shorter than a distance between the light flux device and the second optical element.

In an embodiment, the optical system further includes: a first guiding element configured to guide the first movable portion and the second movable portion to move in a first dimension; and a second guiding element configured to guide the first movable portion and the second movable portion to move in the first dimension. Wen viewed in an optical axis of the first optical element, a connecting line between centers of the first guiding element and the second guiding element passes through a center of the first optical element, and the extending direction of the first guiding element and the second guiding element is substantially parallel to the optical axis.

In an embodiment, materials of the first guiding element and the second guiding element include a metallic material with magnetic permeability, and an attraction force is generated between the first guiding element, the second guiding element and the fixed portion. In an embodiment, the materials of the first guiding element and the second guiding element are different, one of the first guiding element or the second guiding element comprises a metallic material with magnetic permeability, and the other of the first guiding element or the second guiding element comprises a non-metallic material.

In an embodiment, the first driving assembly further includes: a first coil disposed on the fixed portion; and a first magnetic element disposed on the first movable portion and corresponding to the first coil to generate a first driving force, wherein the first magnetic element has a surface facing the first coil. The second driving assembly further includes: a second coil disposed on the fixed portion; and a second magnetic element disposed on the second movable portion and corresponding to the second coil to generate a second driving force. When viewed in a direction that is parallel to the surface, the first coil and the second coil do not overlap, and the first magnetic element and the second magnetic element do not overlap. In an embodiment, when viewed in a direction that is perpendicular to the surface, the first coil and the second coil at least partially overlap.

In an embodiment, the optical system further includes: a first base, a second base, and a plurality of guiding elements. The first movable portion is bonded to the first base. The second movable portion is bonded to the second base. The guiding elements pass through the first base and the second base, and a connecting line between the guiding elements do not pass through the first optical element or the second optical element. In an embodiment, the optical system further includes a piezoelectric assembly. The piezoelectric assembly comprises a first piezoelectric element connected to the first base and a second piezoelectric element connected to the second base, and the extending direction of the first piezoelectric element and the second piezoelectric element is substantially parallel to the extending direction of the guiding elements.

In an embodiment, the optical system further includes a first reflective element configured to change the traveling direction of the light beam, wherein the light beam passes through the first reflective element, the first optical element, the second optical element, and the third optical element in sequence. In an embodiment, the optical system further includes a second reflective element configured to change the traveling direction of the light beam, wherein the light beam passes through the first reflective element, the first optical element, the second optical element, the second reflective element, and the third optical element in sequence. In an embodiment, the traveling direction of the light beam before entering the first reflective element is substantially parallel to the traveling direction of the light beam after leaving the second reflective element.

In an embodiment, the first reflective element is movable relative to the fixed portion and includes: a first reflective sub-element and a second reflective sub-element. The movement direction of the first reflective sub-element is different from the movement direction of the second reflective sub-element, and the light beam passes through the first reflective sub-element, the second reflective sub-element, the first optical element, the second optical element, the second reflective element, and the third optical element in sequence. In an embodiment, the second reflective element is movable relative to the fixed portion and includes: a third reflective sub-element and a fourth reflective sub-element. The movement direction of the third reflective sub-element is different from the movement direction of the fourth reflective sub-element, and the light beam passes through the first reflective element, the first optical element, the second optical element, the third reflective sub-element, the fourth reflective sub-element, and the third optical element in sequence.

In an embodiment, the first reflective element and the second reflective element are movable relative to the fixed portion, and the movement directions of the movable portion, the first reflective element, and the second reflective element are different from each other. In an embodiment, the optical system further includes a lens affixed to a surface of the first reflective element, wherein the light beam passes through the lens, the first reflective element, and the first optical element, and the lens has a curved surface. In an embodiment, a focal length of the lens is shorter than a focal lens of the first optical element. In an embodiment, the movable portion further comprises a third movable portion configured to connect the third optical element, and the third movable portion is movable relative to the first movable portion and the second movable portion.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical systems of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," "third," "fourth," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure. Unless defined otherwise, the first or second element, material and/or portion may be referred to as any element, material and/or portion in the present specification without departing from the scope of the claims.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
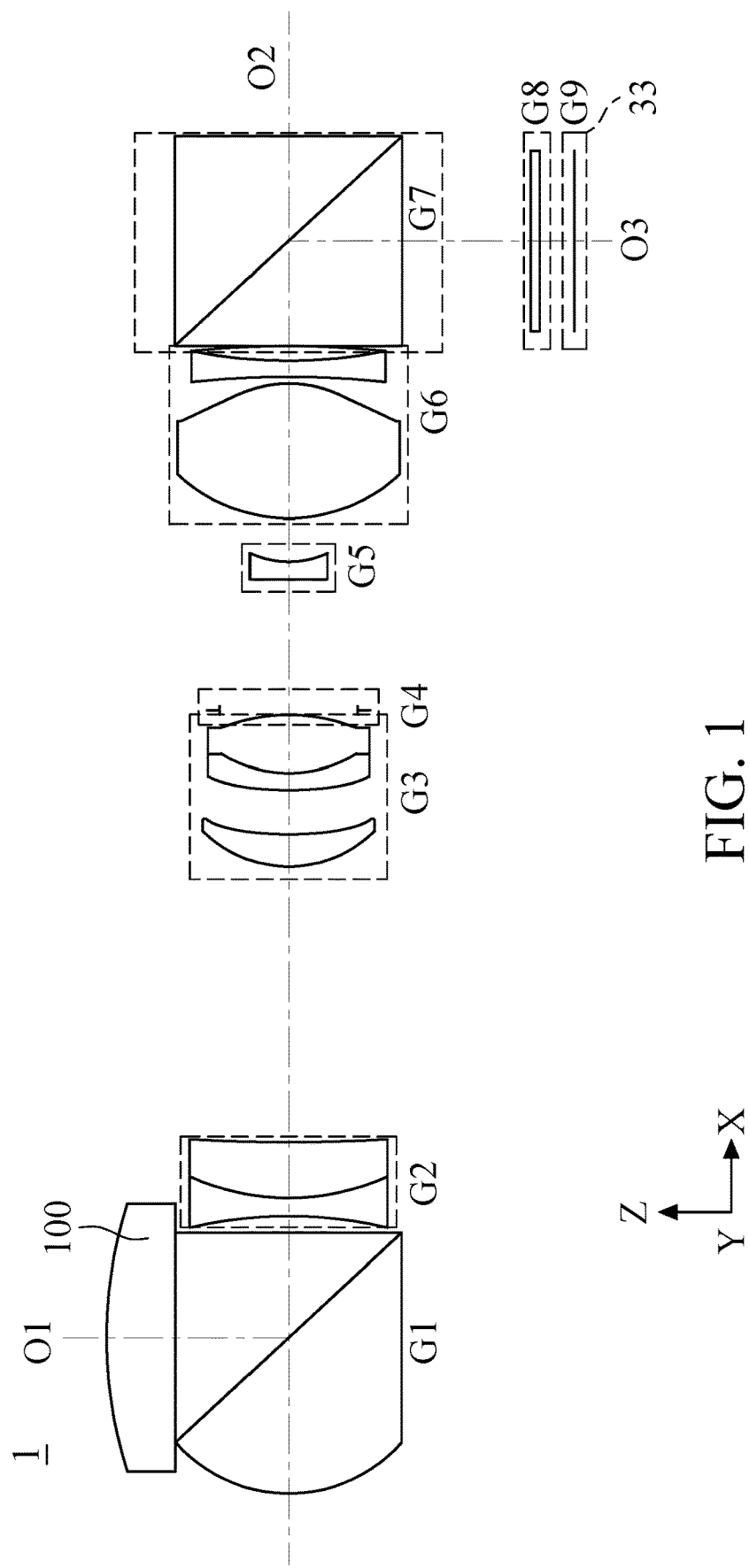
FIG. 1 is a schematic view illustrating an optical system in accordance with an embodiment of the present disclosure.

FIG. 1 is a schematic perspective view illustrating an optical system 1 in accordance with an embodiment of the present disclosure. It should be noted that, in this embodiment, the optical system 1 may be, for example, disposed in the electronic devices (not shown) with camera function, and a driving assembly inside the optical system may be configured to drive an optical element to move. Controlling the position of the optical element can perform an autofocus (AF) and/or optical image stabilization (OIS) function.

As shown in FIG. 1, the optical system 1 includes a reflective element G1 and a lens 100 disposed on the reflective element G1. In some embodiments, the lens 100 is affixed on a surface of the reflective element G1 and has a curved surface. The above configuration may help to reduce the problem of misalignment of the reflective element G1 and the lens 100, and therefore the image quality may be improved. In addition, the optical system 1 has a first optical axis O1, which is substantially parallel to the Z axis. The first optical axis O1 may pass through the lens 100 and the reflective element G1, so that light beams may sequentially pass through the lens 100 and the reflective element G1. In addition, the optical system 1 further has a second optical axis O2, which is substantially perpendicular to the first optical axis O1. After the light beams enter the optical system 1 along the first optical axis O1 and reach the reflective element G1, the direction of the light beams may be changed and the light beams would travel along the second optical axis O2. In some embodiments, the first optical axis O1 and the second optical axis O2 are not parallel to each other. In addition, in some embodiments, the optical element G2 may be disposed so that the light beams from the reflective element G1 reaches the optical element G2 along the second optical axis O2.

In some embodiments, the optical system 1 further includes an optical element G3, a light flux device G4, and an optical element G5. After the light beams leave the optical element G2, they pass through the optical element G3, the light flux device G4, and the optical element G5 in sequence along the second optical axis O2. In other words, the light flux device G4 may be located between the optical element G3 and the optical element G5. In some embodiments, the optical element G3 is movable relative to the optical element G5 to perform functions such as optical focusing, zooming, and anti-shake.

In some embodiments, the distance between the light flux device G4 and the optical element G3 is shorter than the distance between the light flux device G4 and the optical element G5, where the aforementioned distances may be, for example, measured along the X direction as the shortest distances between the light flux device G4 and the optical element G3 and between the light flux device G4 and the optical element G5. For example, the light flux device G4 may include a fixed aperture or a variable aperture. In some embodiments, the second optical axis O2 passes through the centers of the optical element G3, the light flux device G4, and the optical element G5, but the present disclosure is not limited thereto. In some embodiments, the focal length of the lens 100 is less than the focal length of the optical element G3.

It should be noted that the term "optical area" may be used in the following paragraphs and refers to the largest region that light may pass through in each element. Although the present embodiment merely shows a cross-section view of the optical system 1, those skilled in the art should realize the size relationships between each "optical area" or "area" discussed in the present disclosure. In some embodiments, the optical area of the light flux device G4 may be smaller than the optical area of the optical element G3 and the optical area of the optical element G5. In addition, in some embodiments, the above-mentioned optical element may have any suitable transparent material to allow light beams to pass through. It should be noted that each optical element may also include any number of sub-optical elements (not shown) to improve the optical characteristics of the optical system 1.

In addition, in some embodiments, the optical system 1 also includes an optical element G6 and a reflective element G7. After the light beams leave the optical element G5, they pass through the optical element G6 and the reflective element G7 in sequence along the second optical axis O2. The optical system 1 further has a third optical axis O3, which is substantially parallel to the first optical axis O1 and substantially perpendicular to the second optical axis O2. After the light beams reach the reflective element G7 along the second optical axis O2, the direction of the light beams may be changed and the light beams would travel along the third optical axis O3. In some embodiments, the second optical axis O2 and the third optical axis O3 are not parallel to each other. In some embodiments, the optical element G8 and the optical element G9 may be disposed so that the light beams from the reflective element G7 reach the optical element G8 and the optical element G9 along the third optical axis O3. In some embodiments, the optical element G8 may be a filter element, and the optical element G9 may be a photosensitive element, a light-emitting source, a depth sensor, or the like. With the above arrangement of the optical elements, light beams from the outside and passing through the optical system 1 (for example, including visible light or invisible light) may be received, and the optical system 1 may have improved optical characteristics. In some embodiments, the optical element G8 may be disposed as a shutter, or a shutter may also be disposed between the optical element G8 and the optical element G9.

The various elements included in the optical system 1 are disclosed above. It should be understood that those skilled in the art may add, remove or replace any of the above-mentioned elements as required. For example, the optical system 1 may only include the optical element G3 and the optical element G5. All the possibilities of the optical system 1 will not be listed below. Since the optical system 1 has at least one reflective element, the path of the light beam is changed and some of the optical elements may be arranged in the horizontal direction (for example, the X direction), so that the height of the optical system 1 in the vertical direction (for example, the Z direction) is reduced. Therefore, the miniaturization of the optical system 1 may be achieved, and the thickness of the electronic device equipped with the optical system 1 may also be reduced. The movement modes of each element of the optical system 1 will be explained separately below.

In some embodiments, the optical system 1 may have a driving assembly to drive the reflective element G1 and the reflective element G7 (for example, a prism) to move relative to the fixed portion, so as to perform functions such as autofocus (AF) and/or optical image stabilization (OIS). In some embodiments, the reflective element G1 and the reflective element G7 may rotate about a rotation axis, which is, for example, the X direction and/or the Y direction. For example, one of the reflective element G1 or the reflective element G7 may rotate about the rotation axes (such as the X direction and the Y direction) at the same time, while the other of the reflective element G1 or the reflective element G7 is fixed. Therefore, the driving assembly may be disposed on only one of the reflective element G1 or the reflective element G7, thereby reducing the manufacturing cost.

In other embodiments, one of the reflective element G1 or the reflective element G7 may rotate about a rotation axis, which is the X direction, and the other one of the reflective element G1 or the reflective element G7 may rotate about a rotation axis, which is the Y direction. With the above configuration, the reflective element may rotate in a single direction, and the accuracy of performing functions such as autofocus (AF) and/or optical image stabilization (OIS) may be improved. In still other embodiments, each of the reflective element G1 and the reflective element G7 may rotate about the rotation axes (such as the X direction and the Y direction) at the same time. With the above configuration, both the reflective element G1 and the reflective element G7 may effectively perform functions such as autofocus (AF) and/or optical image stabilization (OIS).

In addition, the optical system 1 may also include a driving assembly (not shown) to drive the movable portion (and the optical element G5) to move relative to the fixed portion, thereby performing functions such as optical focusing, zooming, and anti-shake. In some embodiments, the optical element G5 is movable along the X direction and along the Y-Z plane. In some embodiments, the optical element G5 may also rotate about a rotation axis, which is the Y direction, but the present disclosure is not limited thereto.

In addition, the optical system 1 may also include a driving assembly (not shown) to drive the movable portion 33 (and the optical element G9) to move relative to the fixed portion, thereby performing autofocus (AF) and/or optical image stabilization (OIS) and other functions. In some embodiments, the optical element G9 is movable along the Z direction and along the X-Y plane. In some embodiments, the optical element G9 may also rotate about the rotation axis, which is the Z direction, but the present disclosure is not limited thereto. It should be understood that although the movement modes of the various elements of the optical system 1 are described above, those skilled in the art may select some or all of the movement modes based on their needs. All the possibilities will not be listed in the following paragraphs.

Figure 2B:
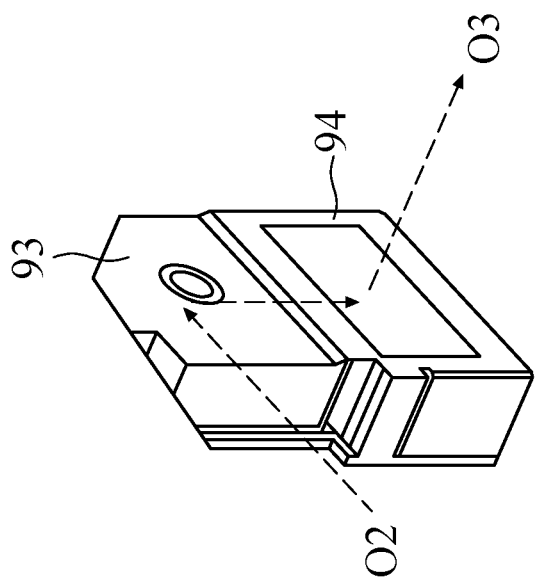
FIG. 2B is a perspective view illustrating a reflective element in accordance with an embodiment of the present disclosure.
Figure 2A:
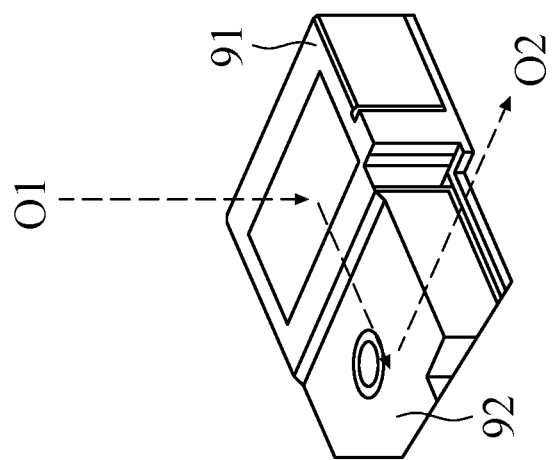
FIG. 2A is a perspective view illustrating a reflective element in accordance with an embodiment of the present disclosure.

FIG. 2A is a perspective view illustrating the reflective element G1 in accordance with an embodiment of the present disclosure. As shown in FIG. 2A, the reflective element G1 may include a first reflective sub-element 91 and a second reflective sub-element 92. In this embodiment, the light beams may pass through the first reflective sub-element 91 and the second reflective sub-element 92 in sequence. More specifically, the light beams may enter the first reflective sub-element 91 along the first optical axis O1 and the traveling direction of the light beams is changed (for example, changed to the Y direction). Then, the light beams enter the second reflective sub-element 92. The second reflective sub-element 92 may also change the traveling direction of the light beams, so that the light beams may travel along the second optical axis O2 and reach the remaining optical elements shown in FIG. 1. Similarly, the first sub-element element 91 and the second reflective sub-element 92 may be driven by the driving assembly (not shown) to move relative to the fixed portion to perform functions such as auto focus (AF) and/or optical image stabilization (OIS). In some embodiments, the movement direction of the first reflective sub-element 91 is different from that of the second reflective sub-element 92. For example, the first reflective sub-element 91 may rotate about the rotation axis, which is the X direction, and the second sub-element element 92 may rotate about the rotation axis, which is the Z direction. However, the above configuration is merely an example, and is not intended to limit the scope of the present disclosure.

FIG. 2B is a perspective view illustrating the reflective element G7 in accordance with an embodiment of the present disclosure. As shown in FIG. 2B, the reflective element G7 may include a third reflective sub-element 93 and a fourth reflective sub-element 94. In this embodiment, the light beams may pass through the third reflective sub-element 93 and the fourth reflective sub-element 94 in sequence. More specifically, the light beams may enter the third reflective sub-element 93 along the second optical axis O2 and the traveling direction of the light beams is changed (for example, changed to travel along the Y direction). Then, the light beams enter the fourth reflective sub-element 94. The fourth reflective sub-element 94 may also change the traveling direction of the light beams so that the light beams travel along the third optical axis O3 to reach the optical elements G8 and G9 shown in FIG. 1. Similarly, the third reflective sub-element 93 and the fourth reflective sub-element 94 may also be driven by a driving assembly (not shown) to move relative to the fixed portion, thereby performing functions such as auto focus (AF) and/or optical image stabilization (OIS). In some embodiments, the movement direction of the third reflective sub-element 93 is different from that of the fourth reflective sub-element 94. For example, the third reflective sub-element 93 may rotate about the rotation axis, which is the Z direction, and the fourth reflective sub-element 94 may rotate about the rotation axis, which is the X direction. However, the present disclosure is not limited thereto. With the above configuration, the reflective sub-element may rotate in a single direction, and the accuracy of performing functions such as auto focus (AF) and/or optical image stabilization (OIS) may be improved.

Figure 3:
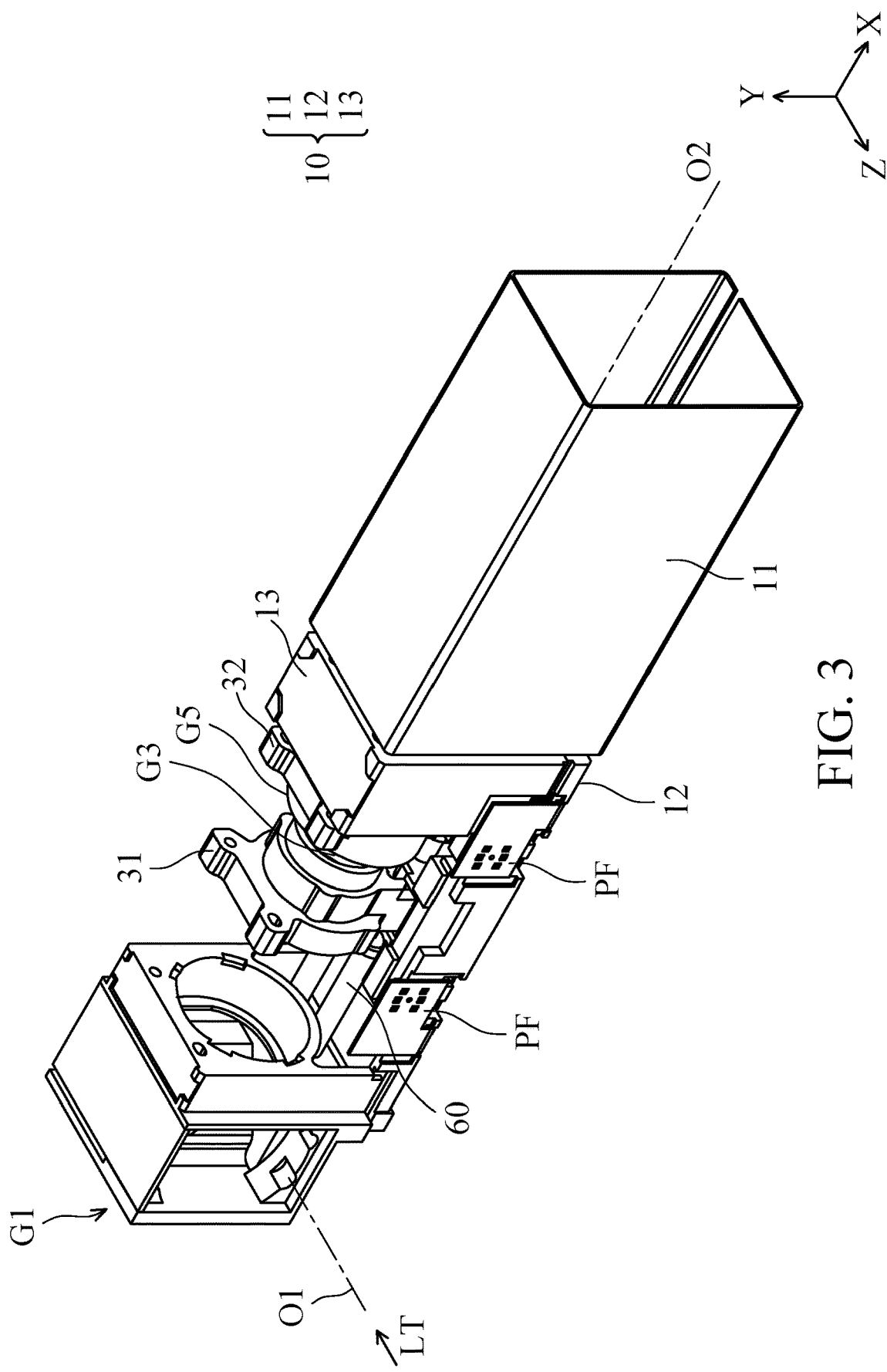
FIG. 3 is a partial perspective view illustrating the optical system in accordance with an embodiment of the present disclosure.
Figure 4:
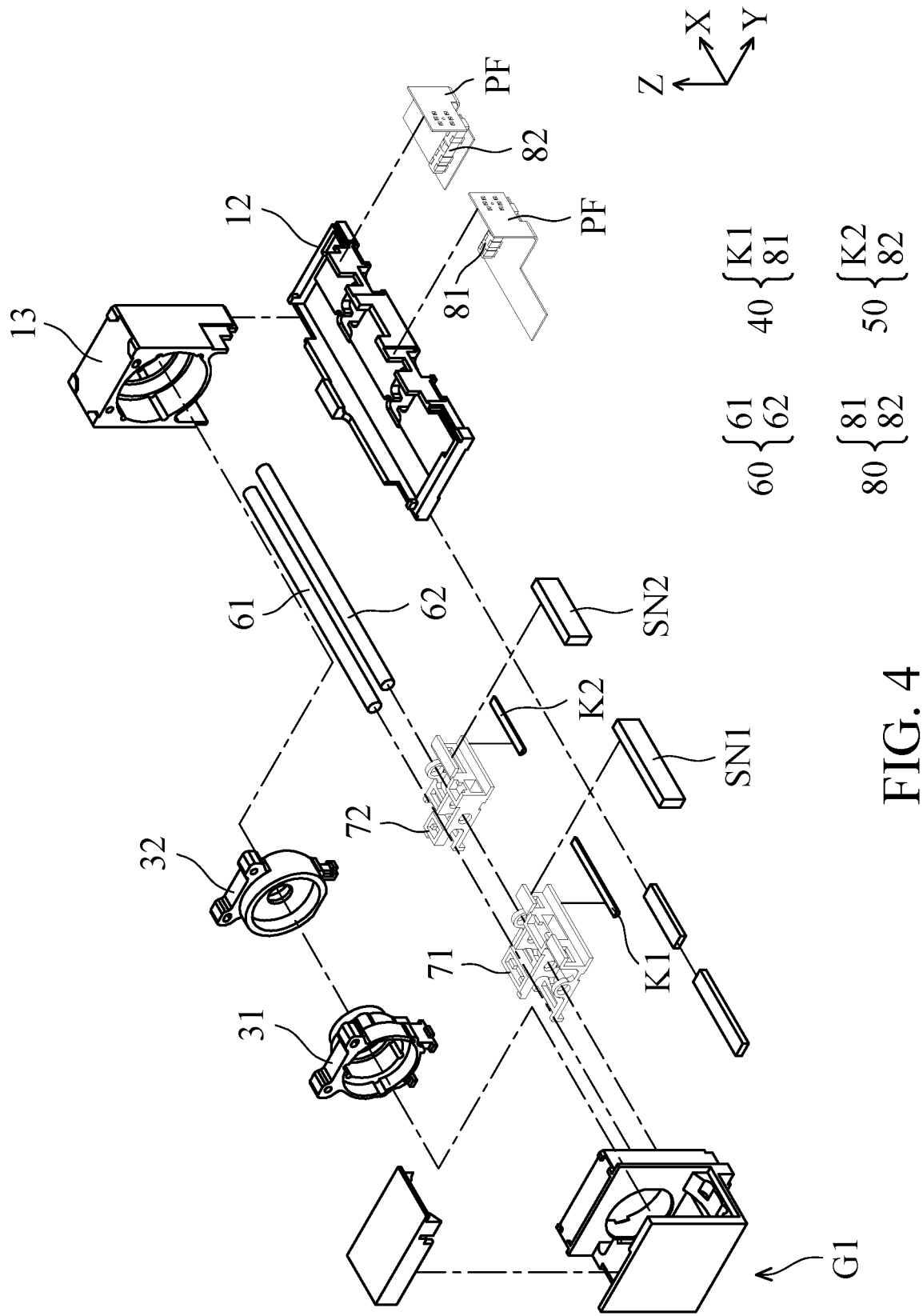
FIG. 4 is a partial exploded view illustrating the optical system in accordance with an embodiment of the present disclosure.

FIG. 3 is a partial perspective view illustrating the optical system 1 in accordance with an embodiment of the present disclosure. FIG. 4 is a partial exploded view illustrating the optical system 1 in accordance with an embodiment of the present disclosure. The optical system 1 also includes a first driving assembly 40, a second driving assembly 50 and a guiding assembly 60. In this embodiment, the light beams LT may enter the reflective element G1 along the first optical axis O1, and the traveling direction of the light beams LT may be changed so as to pass through the optical element G3 and the optical element G5 along the second optical axis O2. The first movable portion 31 is configured to connect the optical element G3, and the first driving assembly 40 is configured to drive the first movable portion 31 to move relative to the fixed portion 10. The first movable portion 31 is bonded to the first base 71. The second movable portion 32 is configured to connect the optical element G5, and the second driving assembly 50 is configured to drive the second movable portion 32 to move relative to the fixed portion 10. The second movable portion 32 is bonded to the second base 72. The guiding assembly 60 (including the first guiding element 61 and the second guiding element 62) may be configured to guide the first base 71 and the second base 72 to move along the first dimension. For example, the guiding assembly 60 may be configured to guide the first base 71 and the second base 72 to move in a direction that is substantially parallel to the second optical axis O2.

In some embodiments, the fixed portion 10 may include a housing 11, a side plate 12, and a sleeve 13. The side plate 12 and the sleeve 13 are disposed in the housing 11, and the side plate 12 may include a circuit board assembly PF. The housing 11 has an accommodation space in which the first movable portion 31, the first driving assembly 40, the guiding assembly 60, the second movable portion 32, and the second driving assembly 50 are disposed for protection. In some embodiments, when viewed along a direction that is substantially parallel to the second optical axis O2, the fixed portion 10 may have a polygonal structure. However, the present disclosure is not limited thereto.

In some embodiments, when viewed in a direction that is substantially parallel to the second optical axis O2, the first driving assembly 40, the second driving assembly 50, and the position sensing components SN1 and SN2 are located on one side of the fixed portion 10. The guiding assembly 60 is located on another side of the fixed portion 10. In some embodiments, the side on which the first driving assembly 40, the second driving assembly 50, and the position sensing components SN1 and SN2 are disposed is opposite to the side on which the guiding assembly 60 is disposed, but the present disclosure is not limited thereto. In addition, the guiding assembly 60 may be a long rod extending in a direction that is substantially parallel to the second optical axis O2 and passing through the first base 71 and the second base 72, so that the first base 71 and the second base 72 may move or slide thereon. In some embodiments, the connecting line between the first guiding element 61 and the second guiding element 62 does not pass through the optical element G3 or the optical element G5.

Referring to FIGS. 3 and 4, the first driving assembly 40 includes a first piezoelectric element 81 and a first contact element K1, which correspond to each other. The first piezoelectric element 81 is connected to the first base 71 and has a piezoelectric material. In some embodiments, the first piezoelectric element 81 has silicon carbide material. The first piezoelectric element 81 and the first contact element K1 are fixedly disposed on the first movable portion 31 and the fixed portion 10, respectively. When viewed in a direction that is substantially perpendicular to the second optical axis O2, the first piezoelectric element 81 and the first contact element K1 at least partially overlap.

Similarly, the second driving assembly 50 is configured to drive the second movable portion 32, and includes a second piezoelectric element 82 and a second contact element K2, which correspond to each other. The second piezoelectric element 82 is connected to the second base 72 and has a piezoelectric material. The second piezoelectric element 82 and the second contact element K2 are fixedly disposed on the second movable portion 32 and the fixed portion 10, respectively. When viewed in a direction that is substantially perpendicular to the second optical axis O2, the second piezoelectric element 82 at least partially overlaps the second contact element K2. The first piezoelectric element 81 and the second piezoelectric element 82 may constitute a piezoelectric assembly 80, and the extension direction of the first piezoelectric element 81 and the second piezoelectric element 82 may be substantially parallel to the extension direction of the guiding assembly 60. As such, with the arrangement of the first driving assembly 40, the second driving assembly 50 and the guiding assembly 60, the first movable portion 31 and the second movable portion 32 is movable relative to the fixed portion 10 to achieve the effect of optical focusing, zooming, and anti-shake.

Figure 5:
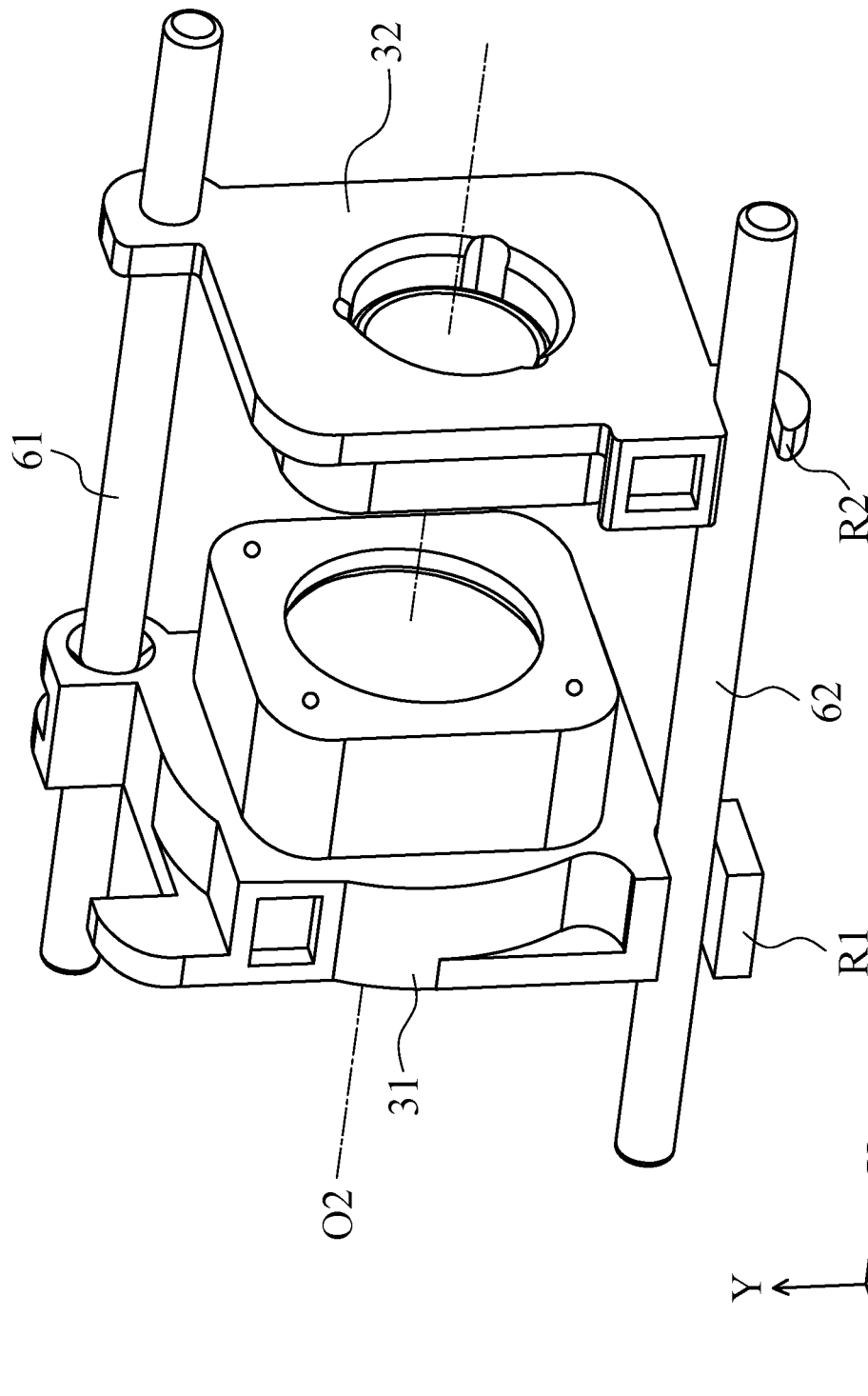
FIG. 5 is a partial perspective view illustrating the optical system in accordance with an embodiment of the present disclosure.
Figure 6:
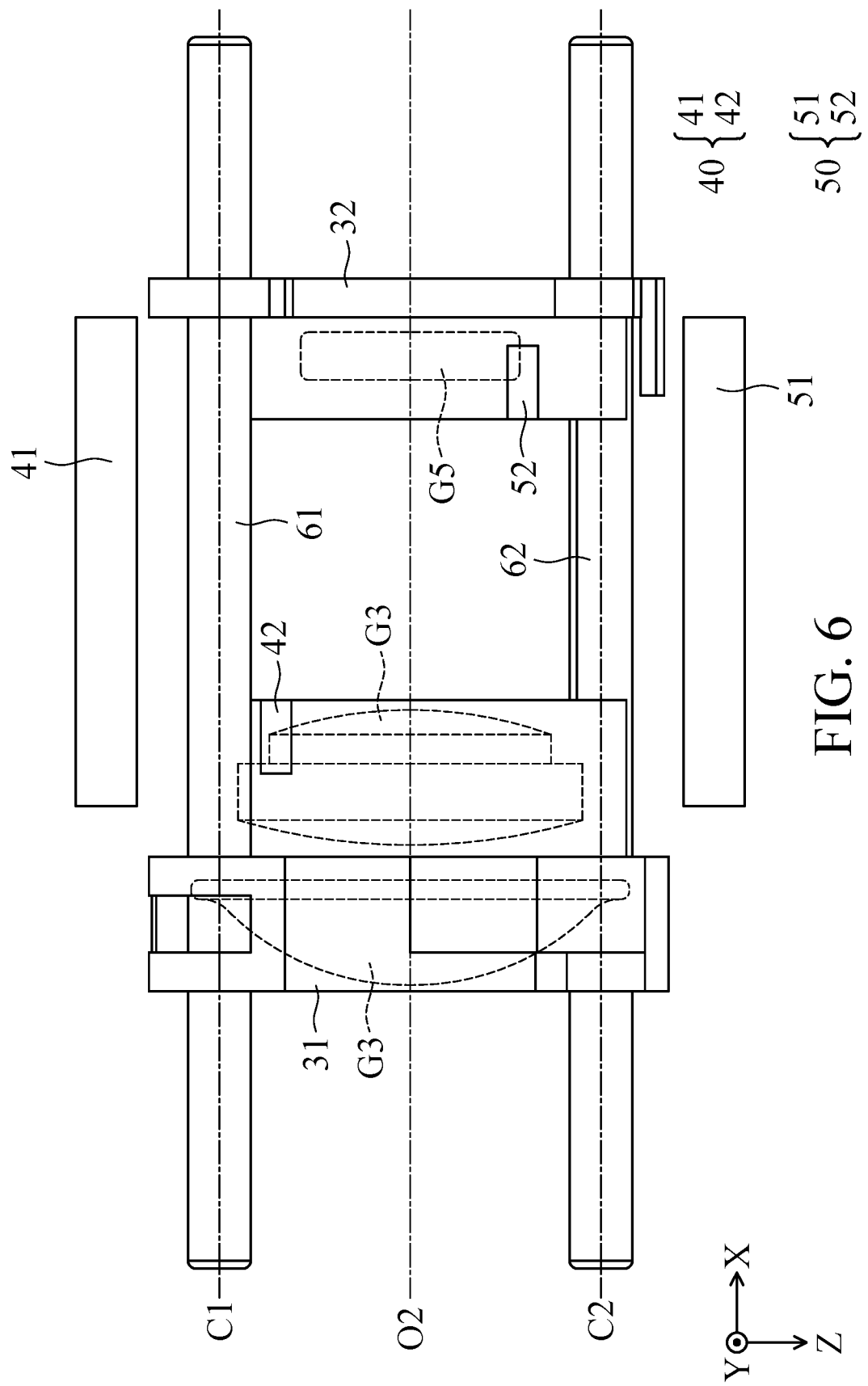
FIG. 6 is a partial top view illustrating the optical system in accordance with an embodiment of the present disclosure.

FIG. 5 is a partial perspective view illustrating the optical system 1 in accordance with an embodiment of the present disclosure. FIG. 6 is a partial top view illustrating the optical system 1 in accordance with an embodiment of the present disclosure. In this embodiment, the first movable portion 31 has a first groove R1. The first guiding element 61 may pass through the first movable portion 31, and the second guiding element 62 may be located in the first groove R1. Similarly, the second movable portion 32 also has a second groove R2. The first guiding element 61 may pass through the second movable portion 32, and the second guiding element 62 may be located in the second groove R2.

In some embodiments, the first guiding element 61 and the second guiding element 62 may be configured to guide the first movable portion 31 and the second movable portion 32 to move along the first dimension. For example, the first guiding element 61 and the second guiding element 62 may be configured to guide the first movable portion 31 and the second movable portion 32 to move in a direction that is substantially parallel to the second optical axis O2. In some embodiments, when viewed in a direction that is substantially parallel to the second optical axis O2, the line connecting the centers of the first guiding element 61 and the second guiding element 62 passes through the center of the optical element (for example, the optical element G3 or G5). The extending directions of the first guiding element 61 and the second guiding element 62 are substantially parallel to the second optical axis O2. More specifically, the first guiding element 61 has a first axis C1, and the second guiding element 62 has a second axis C2. The first axis C1 and the second axis C2 may be substantially parallel to the second optical axis O2. Since the first groove 214 and the second groove 224 have an open structure, even if the parallelism between the first guiding element 131 and the second guiding element 132 has a slight error, it will not affect the assembly of the overall mechanism.

In some embodiments, the material of the first guiding element 61 and the second guiding element 62 may include a metallic material with magnetic permeability, and an attraction force (for example, magnetic attraction force) may be generated between the fixed portion 10 (not shown in this embodiment) the first guiding element 61 and the second guiding elements 62. In some embodiments, the materials of the first guiding element 61 and the second guiding element 62 are different. For example, one of the first guiding element 61 or the second guiding element 62 includes a metal material with magnetic permeability, and the other includes a non-metal material. With the above configuration, the positioning between the first guiding element 61, the second guiding element 62 and the fixed portion 10 may be improved.

As shown in FIG. 6, in some embodiments, the optical system 1 also includes a first driving assembly 40 and a second driving assembly 50. The first driving assembly 40 is configured to drive the first movable portion 31 to move relative to the fixed portion 10. The second driving assembly 50 is configured to drive the second movable portion 32 to move relative to the fixed portion 10. The first driving assembly 40 includes a first coil 41, which is disposed on the fixed portion 10 (not shown in this embodiment). The first driving assembly 40 also includes a first magnetic element 42 disposed on the first movable portion 31. The first magnetic element 42 corresponds to the first coil 41 to generate a first driving force, wherein the first magnetic element 42 has a surface facing the first coil 41. Similarly, the second driving assembly 50 includes a second coil 51 disposed on the fixed portion 10. The second driving assembly 50 also includes a second magnetic element 52 disposed on the second movable portion 32, and the second magnetic element 52 corresponds to the second coil 51 to generate a second driving force. In some embodiments, when viewed in a direction that is substantially parallel to the surface of the first magnetic element 42 facing the first coil 41 (that is, viewed from a top view), the first coil 41 and the second coil 51 do not overlap, and the first magnetic element 42 and the second magnetic element 52 do not overlap. With the above configuration, the first movable portion 31 and the second movable portion 32 are movable relative to the fixed portion 10 to achieve the effects of optical focusing, zooming, and anti-shake.

As set forth above, the embodiments of the present disclosure provide an optical system including a plurality of movable portions to hold different optical elements, wherein some of the optical elements are movable relative to some of the other optical elements. Since the optical system has at least one reflective element, the path of the light is changed and some of the optical elements may be arranged in the horizontal direction, so that the required height of the optical system in the vertical direction is reduced. Therefore, the miniaturization of the optical system may be achieved, and the thickness of the electronic device equipped with the optical system may be reduced. In addition, those skilled in the art may arbitrarily select the movement mode of the elements discussed in the present disclosure, thereby reducing manufacturing costs, or improving the accuracy of performing functions such as auto focus (AF) and/or optical image stabilization (OIS).

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical system, comprising:
   a fixed portion;
   a movable portion movable relative to the fixed portion and comprising:
      a first movable portion configured to connect a first optical element; and
      a second movable portion configured to connect a second optical element, wherein the second movable portion is movable relative to the first movable portion; and
   a driving assembly configured to drive the movable portion to move relative to the fixed portion, comprising:
      a first driving assembly configured to drive the first movable portion to move; and
      a second driving assembly configured to drive the second movable portion to move relative to the fixed portion, wherein the second driving assembly is configured to drive the second movable portion to move relative to the first movable portion;
   a first base, wherein the first movable portion is bonded to the first base;
   a second base, wherein the second movable portion is bonded to the second base;
   a plurality of guiding elements each parallel to an optical axis of the first optical element and the second optical element, and passing through both of the first base and the second base, wherein a connecting line between the guiding elements do not pass through the first optical element or the second optical element; and
   a third optical element disposed corresponding to the first optical element and the second optical element, wherein a light beam passes through the first optical element, the second optical element, and the third optical element.

2. The optical system as claimed in claim 1, further comprising a light flux device, wherein the light beam passes through the first optical element, the light flux device, and the second optical element in sequence.

3. The optical system as claimed in claim 2, wherein a distance between the light flux device and the first optical element is shorter than a distance between the light flux device and the second optical element.

4. The optical system as claimed in claim 1, further comprising:
   a first guiding element configured to guide the first movable portion and the second movable portion to move in a first dimension; and
   a second guiding element configured to guide the first movable portion and the second movable portion to move in the first dimension, wherein when viewed in the optical axis of the first optical element and the second optical element, a connecting line between centers of the first guiding element and the second guiding element passes through a center of the first optical element, and an extending direction of the first guiding element and the second guiding element is substantially parallel to the optical axis.

5. The optical system as claimed in claim 4, wherein materials of the first guiding element and the second guiding element comprise a metallic material with magnetic permeability, and an attraction force is generated between the first guiding element, the second guiding element and the fixed portion.

6. The optical system as claimed in claim 4, wherein materials of the first guiding element and the second guiding element are different, one of the first guiding element or the second guiding element comprises a metallic material with magnetic permeability, and the other of the first guiding element or the second guiding element comprises a nonmetallic material.

7. The optical system as claimed in claim 1, wherein the first driving assembly further comprises:
   a first coil disposed on the fixed portion; and
   a first magnetic element disposed on the first movable portion and corresponding to the first coil to generate a first driving force, wherein the first magnetic element has a surface facing the first coil,
   wherein the second driving assembly further comprises:
   a second coil disposed on the fixed portion; and
   a second magnetic element disposed on the second movable portion and corresponding to the second coil to generate a second driving force, wherein when viewed in a direction that is parallel to the surface, the first coil and the second coil do not overlap, and the first magnetic element and the second magnetic element do not overlap.

8. The optical system as claimed in claim 7, wherein when viewed in a direction that is perpendicular to the surface, the first coil and the second coil at least partially overlap.

9. The optical system as claimed in claim 1, further comprising a piezoelectric assembly, wherein the piezoelectric assembly comprises a first piezoelectric element connected to the first base and a second piezoelectric element connected to the second base, and an extending direction of the first piezoelectric element and the second piezoelectric element is substantially parallel to an extending direction of the guiding elements.

10. The optical system as claimed in claim 1, further comprising a first reflective element configured to change a traveling direction of the light beam, wherein the light beam passes through the first reflective element, the first optical element, the second optical element, and the third optical element in sequence.

11. The optical system as claimed in claim 10, further comprising a second reflective element configured to change the traveling direction of the light beam, wherein the light beam passes through the first reflective element, the first optical element, the second optical element, the second reflective element, and the third optical element in sequence.

12. The optical system as claimed in claim 11, wherein the traveling direction of the light beam before entering the first reflective element is substantially parallel to the traveling direction of the light beam after leaving the second reflective element.

13. The optical system as claimed in claim 11, wherein the first reflective element is movable relative to the fixed portion and comprises:
   a first reflective sub-element; and
   a second reflective sub-element, wherein the light beam passes through the first reflective sub-element, the second reflective sub-element, the first optical element, the second optical element, the second reflective element, and the third optical element in sequence.

14. The optical system as claimed in claim 11, wherein the second reflective element is movable relative to the fixed portion and comprises:
   a third reflective sub-element; and a fourth reflective sub-element, wherein the light beam passes through the first reflective element, the first optical element, the second optical element, the third reflective sub-element, the fourth reflective sub- element, and the third optical element in sequence.

15. The optical system as claimed in claim 11, wherein the first reflective element and the second reflective element are movable relative to the fixed portion, and movement directions of the movable portion, the first reflective element, and the second reflective element are different from each other.

16. The optical system as claimed in claim 10, further comprising a lens affixed to a surface of the first reflective element, wherein the light beam passes through the lens, the first reflective element, and the first optical element, and the lens has a curved surface.

17. The optical system as claimed in claim 16, wherein a focal length of the lens is shorter than a focal lens of the first optical element.

18. The optical system as claimed in claim 1, wherein the movable portion further comprises a third movable portion configured to connect the third optical element, and the third movable portion is movable relative to the first movable portion and the second movable portion.

* * * * *